(12) United States Patent
Kamphuis et al.

(10) Patent No.: US 12,343,620 B2
(45) Date of Patent: Jul. 1, 2025

(54) APPARATUS FOR MANAGING ONLINE GAME, METHOD AND SYSTEM THEREFOR

(71) Applicant: Supercell Oy, Helsinki (FI)

(72) Inventors: Robert Kamphuis, Helsinki (FI); Jonne Loikkanen, Helsinki (FI); Jon Franzas, Helsinki (FI)

(73) Assignee: Supercell Oy, Helsinki (FI)

( * ) Notice: Subject to any disclaimer, the term of this patent is extended or adjusted under 35 U.S.C. 154(b) by 0 days.

(21) Appl. No.: 18/415,004

(22) Filed: Jan. 17, 2024

(65) Prior Publication Data

US 2024/0226732 A1     Jul. 11, 2024

Related U.S. Application Data

(63) Continuation of application No. 17/670,614, filed on Feb. 14, 2022, now Pat. No. 11,918,896, which is a continuation of application No. 16/890,450, filed on Jun. 2, 2020, now Pat. No. 11,247,125.

(51) Int. Cl.
    *A63F 13/358*     (2014.01)
    *A63F 13/335*     (2014.01)
    *A63F 13/798*     (2014.01)
    *H04L 69/164*     (2022.01)

(52) U.S. Cl.
    CPC ......... *A63F 13/358* (2014.09); *A63F 13/335* (2014.09); *A63F 13/798* (2014.09); *H04L 69/164* (2013.01); *A63F 2300/534* (2013.01)

(58) Field of Classification Search
None
See application file for complete search history.

(56) References Cited

U.S. PATENT DOCUMENTS

| | | | |
|---|---|---|---|
| 10,722,788 B2* | 7/2020 | Ng | A63F 13/352 |
| 10,924,525 B2* | 2/2021 | Morrison | H04L 65/70 |
| 2015/0209670 A1 | 7/2015 | Furumoto et al. | |

(Continued)

FOREIGN PATENT DOCUMENTS

| | | |
|---|---|---|
| JP | 2004328734 A | 11/2004 |
| JP | 2012065981 A | 4/2012 |
| JP | 2015139648 A | 8/2015 |

OTHER PUBLICATIONS

Japan Patent Office, Notice of Reasons for Refusal, Application No. 2022-567029, mailed Jan. 16, 2025, 3 pages, English Translation, 4 pages.

*Primary Examiner* — Ronald Laneau
(74) *Attorney, Agent, or Firm* — Ziegler IP Law Group, LLC.

(57) ABSTRACT

An apparatus for managing an online game. The apparatus including a processor and a memory. The processor is configured to identify a set of client devices engaged in an online game; identify game parameters associated with client devices in the set; define group of client devices from the set of client devices, wherein the at least one group of client devices includes client devices with similar game parameter; determine communication latency between each of the client devices in the group of client devices and a server; define subgroup of client devices from each of the group of client devices, wherein the subgroup of client devices includes client devices with a similar communication latency; and enable the client devices in the subgroup of client devices to engage in a game session of the online game.

20 Claims, 3 Drawing Sheets

(56) References Cited

U.S. PATENT DOCUMENTS

| 2019/0118084 | A1* | 4/2019 | Ng | A63F 13/352 |
| 2020/0106619 | A1* | 4/2020 | Osborn | H04L 9/0866 |
| 2022/0233955 | A1* | 7/2022 | Kamphuis | A63F 13/358 |

* cited by examiner

APPARATUS FOR MANAGING ONLINE GAME, METHOD AND SYSTEM THEREFOR

TECHNICAL FIELD

The present disclosure relates generally to data communication systems; and more specifically, to an apparatus for managing an online game for engaging one or more client devices in a game session of the online game.

BACKGROUND

In recent years, with an improvement in processing power of microprocessors used in portable communication devices and an increase in data transmission speeds associated with the Internet, popularity of online gaming has increased manifold. Furthermore, in recent times, online gaming is not only limited to a hobby, but eSports tournaments and championships centered around online games are held around the world, as well as live gameplay-streaming platforms (for example, Twitch®) allow professional gamers (or players of the game) and gameplay-streamers respectively to take up online gaming as a full-time career. Consequently, such gamers are required to practice by playing the online games on a daily basis, with players around the world that share a similar interest in online gaming.

Online gaming is not limited to one or two gaming genres but encompasses almost every gaming genre, whether it be from racing games to sports-based games, or Multiplayer Online Battle Arenas (or MOBAs) to First-Person Shooters (or FPS). It will be appreciated that when a gamer is playing such an online game, a quality of gaming equipment (such as, a microprocessor associated with the device that the gamer is using to play the game, one or more graphics cards used in the device and so forth), as well as a latency of data connection, can greatly impact an outcome of a game being played by the gamer (and consequently, a skill-level developed by the gamer in a long-term).

For example, it is well known that in an FPS game, a gamer playing with a hitscan-based weapon has an advantage with respect to hit-registration over another gamer playing with a projectile-based weapon, when both gamers are experiencing similar latency of data connection. Correspondingly, the gamer playing with the hitscan-based weapon experiences an unfair advantage over the gamer playing with the projectile-based weapon. Therefore, a gameplay-experience for both the gamers is substantially diminished, as well as, a trust-factor associated with the game is minimized for various individuals (for example, for gamers playing the game, potential buyers of the game and/or for viewers of an eSports-match or a livestream of a game).

Therefore, in light of the foregoing discussion, there exists a need to overcome various problems associated with gamers experiencing different latencies of data connection in a gaming environment.

SUMMARY

The present disclosure seeks to provide an apparatus for managing an online game. The present disclosure also seeks to provide a method for managing an online game. The present disclosure also seeks to provide a system for managing an online game. The present disclosure seeks to provide a solution to the existing problem of unfair advantage of a particular player over another in online game, arising majorly due to communication latency between geographically distributed servers and geographically distributed client devices and associated players. Furthermore, the present disclosure seeks to provide a solution to the existing problem of boredom and monotony experienced by a user while playing games, and to provide an overall satisfactory experience for the user. An aim of the present disclosure is to provide a solution that overcomes at least partially the problems encountered in prior art, and provide an efficient and seamless approach for managing online game.

In a first aspect, an embodiment of the present disclosure provides an apparatus for managing an online game, the apparatus comprising a processor and a memory, wherein the processor is configured to:
 identify a set of client devices engaged in an online game, the set of client devices communicatively coupled to the apparatus;
 identify one or more game parameters associated with each of client devices in the set;
 define at least one group of client devices from the set of client devices, wherein the at least one group of client devices includes client devices with a similar game parameter;
 determine a communication latency between each of the client devices in the at least one group of client devices and a server;
 define at least one subgroup of client devices from each of the at least one group of client devices, wherein the at least one subgroup of client devices includes client devices with a similar communication latency; and
 enable the client devices in the at least one subgroup of client devices to engage in a game session of the online game.

In a second aspect, an embodiment of the present disclosure provides a method for managing an online game, the method comprising:
 identifying a set of client devices engaged in an online game;
 identifying one or more game parameters associated with each of the client devices in the set;
 defining at least one group of client devices from the set of client devices, wherein the at least one group of client devices includes client devices with a similar game parameter;
 determining a communication latency between each of the client devices in the at least one group of client devices and a server;
 defining at least one subgroup of client devices from each of the at least one group of client devices, wherein the at least one subgroup of client devices includes client devices with a similar communication latency; and
 enabling the client devices in the at least one subgroup of client devices to engage in a game session of the online game.

In a third aspect, an embodiment of the present disclosure provides a system for managing an online game, the system comprising:
 a server communicatively coupled to a set of client devices; and
 an apparatus communicatively coupled to the server and the set of client devices, wherein the apparatus is configured to:
 identify a set of client devices engaged in an online game, the set of client devices communicatively coupled to the apparatus;
 identify one or more game parameters associated with each of the client devices in the set;

define at least one group of client devices from the set of client devices, wherein the at least one group of client devices includes client devices with a similar game parameter;

determine a communication latency between each of the client devices in the at least one group of client devices and a server;

define at least one subgroup of client devices from each of the at least one group of client devices, wherein the at least one subgroup of client devices includes client devices with a similar communication latency; and enable the client devices in the at least one subgroup of client devices to engage in a game session of the online game.

Embodiments of the present disclosure substantially eliminate or at least partially address the aforementioned problems in the prior art, and enables maintenance of interest of a user in the online game by engaging same skill level or same latency value users associated with corresponding client devices in a game session. Consequently, the apparatus efficiently and seamlessly manages online game to provide an enhanced user experience.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale.

Wherever possible, like elements have been indicated by identical numbers.

Figure 1:
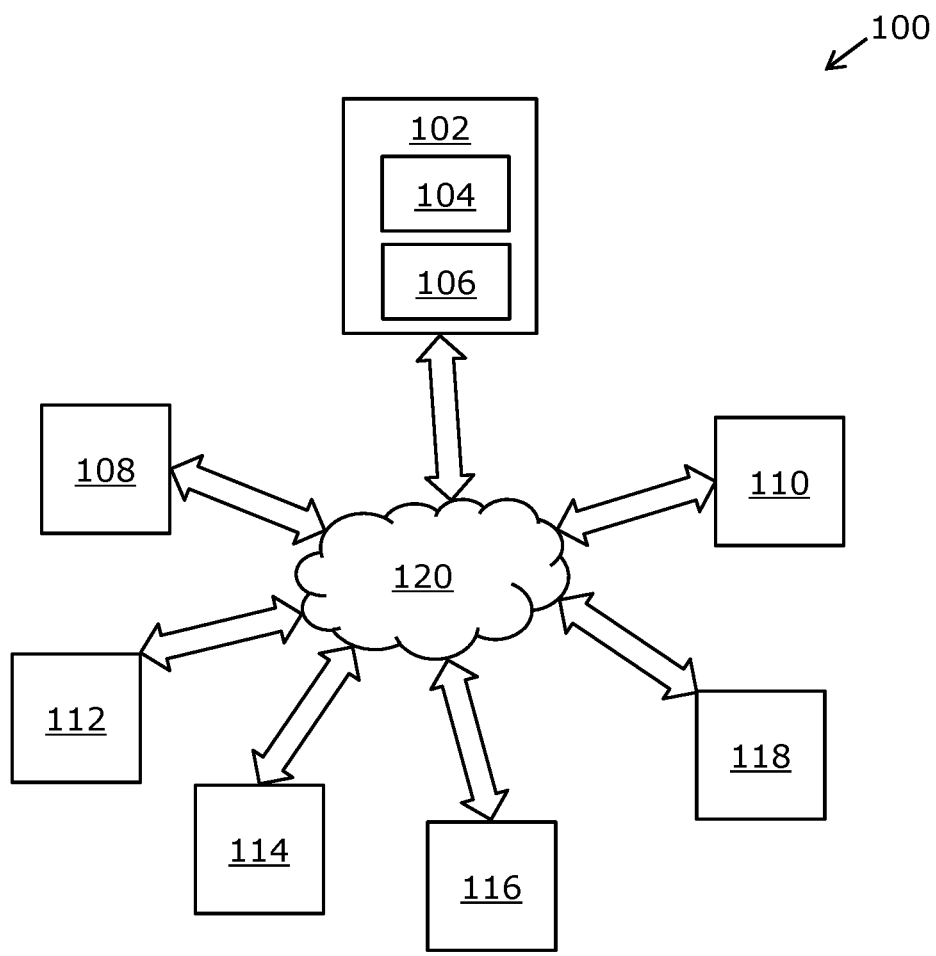
Figure 2:
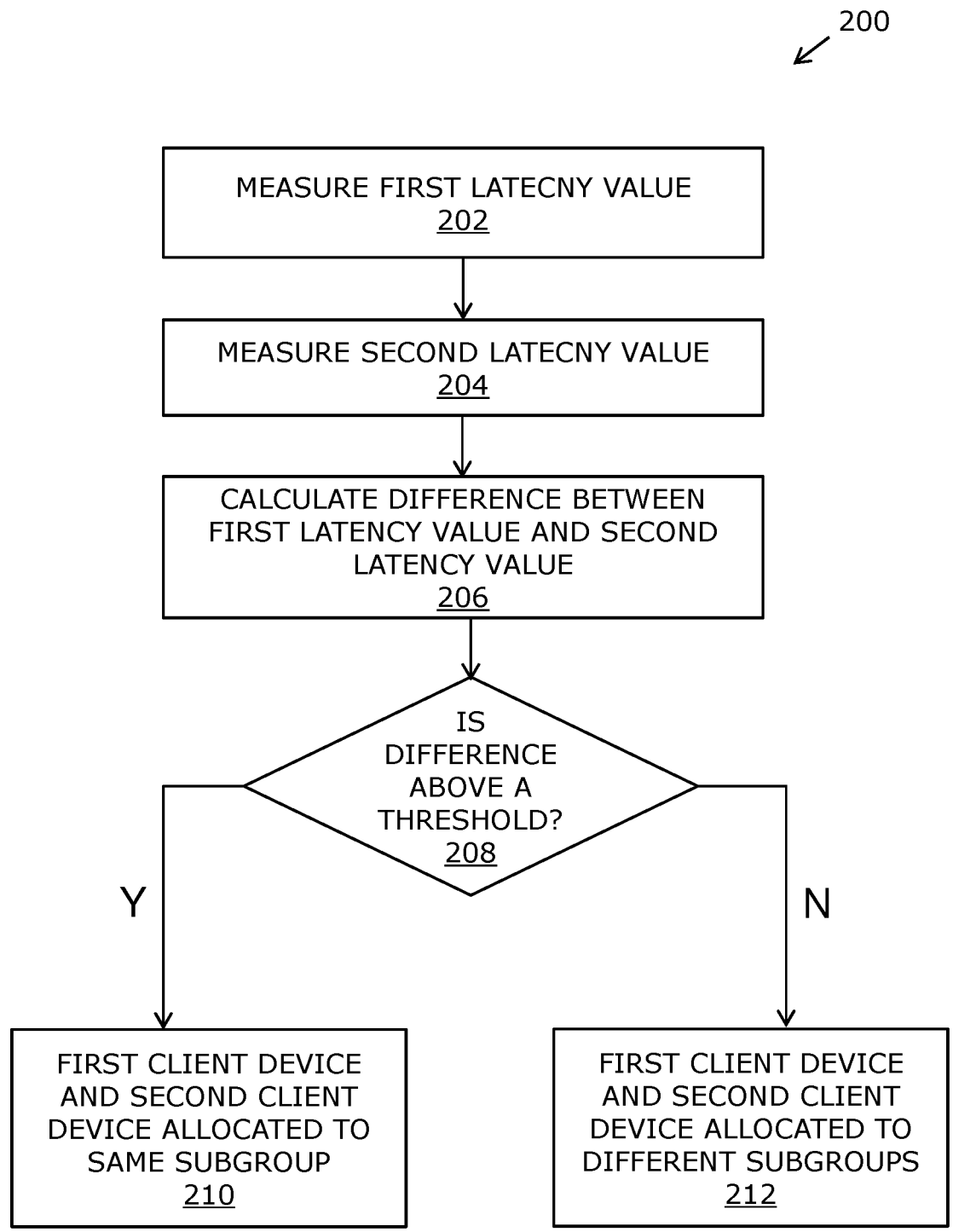
Figure 3:
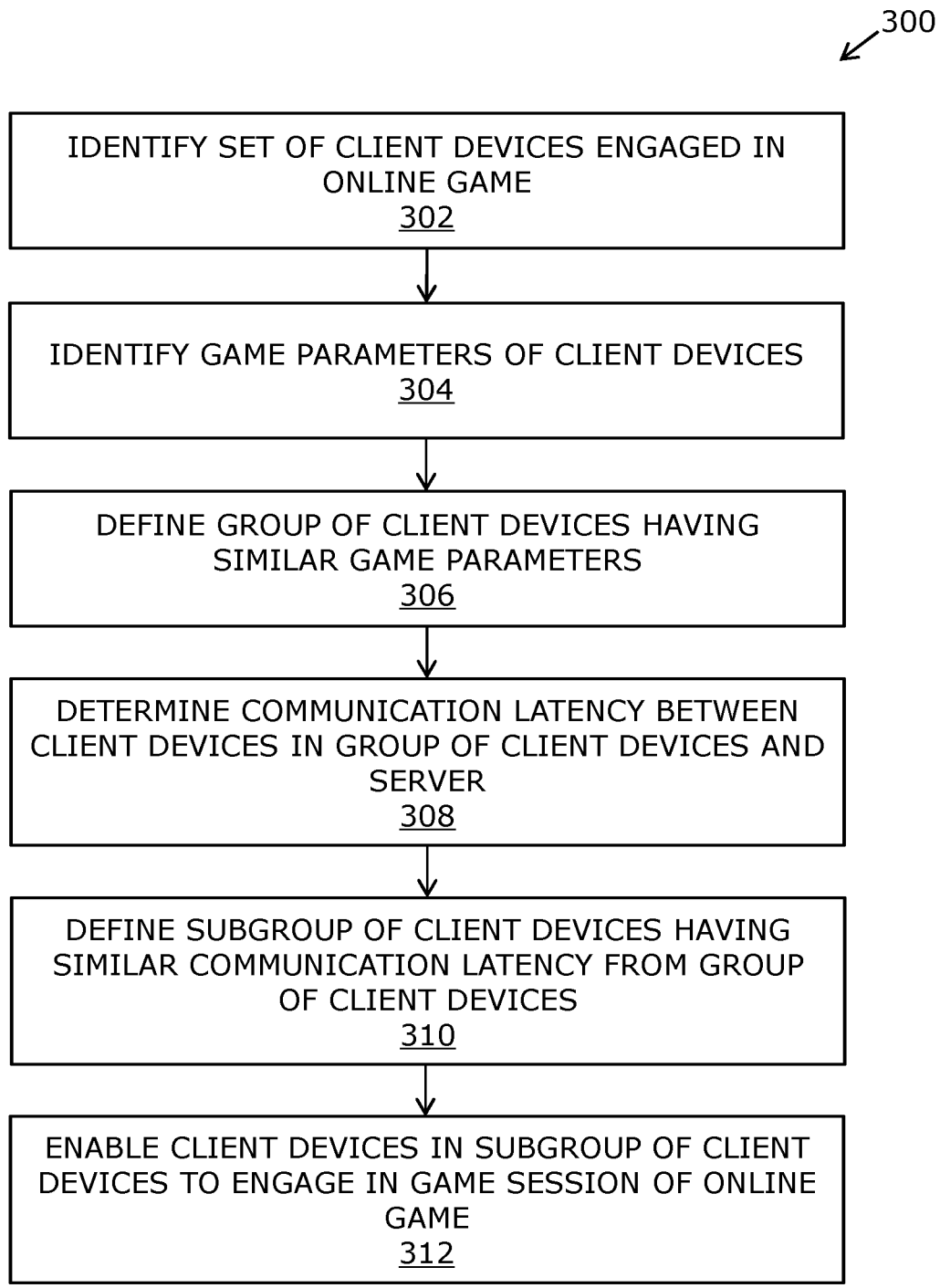

Embodiments of the present disclosure will now be described, by way of example only, with reference to the following diagrams wherein:

FIG. 1 is a schematic illustration of block diagram of a network environment, in accordance with an embodiment of the present disclosure;

FIG. 2 is an illustration of a flowchart depicting steps to define at least one subgroup of client devices, in accordance with an embodiment of the present disclosure; and FIG. 3 is an illustration of a flowchart depicting steps of a method for managing an online game, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In a first aspect, an embodiment of the present disclosure provides an apparatus for managing an online game, the apparatus comprising a processor and a memory, wherein the processor is configured to:

identify a set of client devices engaged in an online game, the set of client devices communicatively coupled to the apparatus;

identify one or more game parameters associated with each of client devices in the set;

define at least one group of client devices from the set of client devices, wherein the at least one group of client devices includes client devices with a similar game parameter;

determine a communication latency between each of the client devices in the at least one group of client devices and a server;

define at least one subgroup of client devices from each of the at least one group of client devices, wherein the at least one subgroup of client devices includes client devices with a similar communication latency; and enable the client devices in the at least one subgroup of client devices to engage in a game session of the online game.

In a second aspect, an embodiment of the present disclosure provides a method for managing an online game, the method comprising:

identifying a set of client devices engaged in an online game;

identifying one or more game parameters associated with each of the client devices in the set;

defining at least one group of client devices from the set of client devices, wherein the at least one group of client devices includes client devices with a similar game parameter;

determining a communication latency between each of the client devices in the at least one group of client devices and a server;

defining at least one subgroup of client devices from each of the at least one group of client devices, wherein the at least one subgroup of client devices includes client devices with a similar communication latency; and enabling the client devices in the at least one subgroup of client devices to engage in a game session of the online game.

In a third aspect, an embodiment of the present disclosure provides a system for managing an online game, the system comprising:

a server communicatively coupled to a set of client devices; and an apparatus communicatively coupled to the server and the set of client devices, wherein the apparatus is configured to:

identify a set of client devices engaged in an online game, the set of client devices communicatively coupled to the apparatus;

identify one or more game parameters associated with each of the client devices in the set;

define at least one group of client devices from the set of client devices, wherein the at least one group of client devices includes client devices with a similar game parameter;

determine a communication latency between each of the client devices in the at least one group of client devices and a server;

define at least one subgroup of client devices from each of the at least one group of client devices, wherein the at least one subgroup of client devices includes client devices with a similar communication latency; and enable the client devices in the at least one subgroup of client devices to engage in a game session of the online game.

The present disclosure provides an apparatus, a system and a method for managing an online game in order to provide a fair play gaming experience to users (also referred to as "players" and the two terms have been interchangeably used hereinafter) associated with the set of client devices engaged in the online game. Embodiments of the present disclosure provides techniques for mitigating unfair advantage of one user over the other, that may be a result of network and data latencies, and other game parameters that subsequently result in unpleasant experiences for the users or players engaged in the online game. Furthermore, the present disclosure provides an apparatus to engage same skill level or same latency value users associated with corresponding client devices in a game session, thereby reducing boredom and maintaining interest of a user in the online game The present disclosure provides an apparatus for managing an online game. Throughout the present disclosure, the term "online game" as used herein refers to complete, self-contained computer programs designed to perform specific functions, tasks, or activities, such as application programs specifically designed for gaming purposes. In the present examples, the online game can be of genres, such as racing games, adventure games, puzzle games, action games, role-playing games (RPG), strategy games, shooting games, simulation games and so forth. In an example, the online game is designed to provide an interactive environment to the users or players to play a game thereon. The user is allowed to engage in a game session in the online game, after the user has gained access to the online game. The user may be allowed to play a game on the application in a real-time mode, a near real-time mode or an offline mode, depending upon features of the online game. In present examples, the online game is a multi-player game environment. Herein, the online game may incorporate multiple users, such that each user is selected to engage in a same game session of the online game depending on a few defined parameters, such that the users have a fairly competitive experience in the online game irrespective of latencies in the gaming environment.

Throughout the present disclosure the term "user" as used herein relates to a person (i.e., human being) using the computing device to access the online game and perform user specific actions in the online game.

It will be appreciated that the teachings of the present disclosure are applicable to any data communication environment that comprises multiple client devices accessing other servers and/or client devices in the data communication environment wherein applications strive for similar parameters or characteristics to have an interaction therebetween. An example of such an application is online gaming. Accordingly, an embodiment of the present invention has been described below with reference to online gaming. It should however be apparent that application of the present invention is not limited to online gaming.

For the purpose of the present disclosure, there will now be considered an exemplary network environment, wherein the apparatus for managing the online game is in communication with a set of client devices engaged in the online game via a communication network. The apparatus and the set of client devices may be connected to the communication network via communication links. Throughout the present disclosure, the term "communication network" relates to an arrangement of interconnected programmable and/or non-programmable components that are configured to facilitate data communication between one or more electronic devices and/or databases, whether available or known at the time of filing or as later developed. Furthermore, the communication network may include, but is not limited to, one or more peer-to-peer network, a hybrid peer-to-peer network. Herein, the communication network can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LAN (WLANs), Wireless WANs (WWANs), Wireless MANs (WMANs), the Internet, second generation (2G) telecommunication networks, third generation (3G) telecommunication networks, fourth generation (4G) telecommunication networks, and Worldwide Interoperability for Microwave Access (WiMAX) networks. Additionally, or alternatively, the computing devices may use their own Bluetooth® network, and connect to a Bluetooth® server, to synchronize with other electronic devices. Optionally, communication links of the network may be of various types including hardwire links, optical links, satellite or other wireless communications links, wave propagation links, or any other mechanisms for communication of information.

It will be appreciated that the network environment may be implemented in various ways, depending on various possible scenarios. In one example scenario, the network environment may be implemented by way of a spatially collocated arrangement of the apparatus comprising a processor and a memory, or the system, the apparatus and the set of client devices. Notably, the apparatus is configured to manage the set of client devices in the online game. It will be appreciated that the server (discussed later in detail) is configured to host the online game. In one or more embodiments, the apparatus comprises a gaming server. Herein, the gaming server is configured to host the online game for multiple users associated with the set of client devices. The present disclosure also provides a system for managing an online game. Herein, the online game is hosted by the server. In such a scenario, each of the set of client devices is communicatively coupled to both the server and the apparatus. In particular, the server is configured to host the online game and the apparatus is configured to manage the set of client devices engaged in the online game. In another example scenario, the network environment may be implemented by way of a spatially distributed arrangement of the apparatus comprising the processor and the memory and the set of client devices in communication via the communication network. In yet another example scenario, the apparatus comprising the processor and the memory may be implemented via cloud server.

Throughout the present disclosure, the term "client devices" as used in "set of client devices", "group of client devices", "subgroup of client devices" refers to relates to an electronic device associated with (or used by) a user that is capable of enabling the user to perform specific tasks associated with the application portal. Furthermore, the term "client device" is intended to be broadly interpreted to include any electronic device that may be used for voice and/or data communication over a wireless communication network. The client devices can include and is not limited to a, mobile phones, smart telephones, Mobile Internet Devices (MIDs), tablet computers, Ultra-Mobile Personal Computers (UMPCs), phablet computers, Personal Digital Assistants (PDAs), web pads, Personal Computers (PCs), Handheld PCs, laptop computers, desktop computers, Network-Attached Storage (NAS) devices, large-sized touch screens with embedded PCs, and interactive entertainment devices, such as game consoles (for example, a Sony Playstation2™, Microsoft X-Box™, Nintendo GameCube™, etc.), Television (TV) sets and Set-Top Boxes (STBs), a video slot machine, a video poker machine, a kiosk, a casino personal device, and typically includes many or all of the elements described above relative to the client devices. Furthermore, the term "client device" may include any other suitable client device or platform that is capable of participating in the online game provided by the server. The set of client devices may interface with the server, either directly or indirectly via communication network. The client device typically runs a program that allows users of the client device to access, process, and view information provided by server or by other systems over Internet. Examples of such programs include browsers (e.g., Microsoft's Internet Explorer, Netscape Navigator), user interface programs, game interfaces, and others.

Optionally, the client devices also typically include input and output devices. Input devices enable a user to interact with client devices and may include a keyboard, a mouse, a touch screen, a pen or other pointing device, a joystick, various game controllers (e.g., controllers for various game consoles, a steering wheel, a gas pedal, etc.), and the like. A user of the client device may use one or more of the input devices to interact with online games provided by a game application and hosted by server. Output devices may include a monitor, a speaker for audio feedback, and the like. Video, audio, images and other types of information provided by the online game may be output to the user using one or more of the output devices.

As aforementioned, the apparatus comprises a processor and a memory. Throughout the present disclosure, the term "processor" as used herein relates to a computational element that is operable to respond to and processes instructions that drive the apparatus. Optionally, the processor includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term "processor" may refer to one or more individual processors, processing devices and various elements associated with a processing device that may be shared by other processing devices. Additionally, the one or more individual processors, processing devices and elements are arranged in various architectures for responding to and processing the instructions that drive the apparatus. Throughout the present disclosure, the term "memory" as sued herein refers to a volatile or persistent medium, such as an electrical circuit, magnetic disk, virtual memory or optical disk, in which a computer can store data or software for any duration. Optionally, the memory is non-volatile mass storage such as physical storage media. Furthermore, the memory can be distributed in a scenario wherein apparatus is distributed. Herein, the memory is configured to store a set of instructions that when executed by the processor, the processor is configured to perform one or more functions as mentioned above.

The processor is configured to identify a set of client devices engaged in an online game. The set of client devices are communicatively coupled to the apparatus. Notably, the processor is configured to identify a running status of each of the client devices to identify the set of client devices. In an example, the processor identifies the client devices that are connected to the apparatus in real-time or near real-time by determining an active communication link between the client devices and the server, thereby determining that the client devices are ready to be engaged in the online game. In another example, the processor identifies a number of client devices as the set of client devices, by determining that the set of client devices that are ready to be engaged in the online game are logged into a gaming account associated the users of the client devices. Notably, the processor determines the running status of client devices prior to engagement of users of the client devices in the online game.

Further, the processor is configured to identify one or more game parameters associated with each of client devices in the set of client devices. Notably, the players associated with each of client devices are allowed to control one or more game characters or objects in online game. The term "game character" may relate to an animated character or an avatar in the online game that is controlled by the player engaged in the online game. The game character may possess various capabilities that allow the game character to perform various actions that are used to accomplish a goal in the online game. It will be appreciated that each of the players have a different expertise of playing the game, such as controlling the game character that can be quantified by the one or more game parameters associated with each of the client devices. The one or more game parameters determine a level of each of the players when compared with each other on the basis of a common parameter.

Optionally, the one or more game parameters comprises one or more of: a skill level of a player associated with a client device, a cumulative playing time of a player associated with a client device, a resource level of a player character associated with a client device, and resources available for an account associated with a client device.

In an example, the identified game parameter is a skill level of a player associated with the client device. The skill level of player is a measure of efficiency of the player with regards to actions performed over a period of time in the online game. Notably, the skill level of the player can be assessed and/or quantified by one or more actions performed by the player such as, precision of performing an action such as taking a head shot in war-based games or taking a sharp definition curve in racing games, decision making skills such as management of resources in strategy-based games or wager-based games, highest rewards collected in the online game, highest game level attained in the online game, and so forth.

In another example, the identified game parameter is a cumulative playing time of a player associated with a client device. It will be appreciated that the cumulative playing time of the player associated with the client device, corresponds to a skill-level of the player in the game. In such an example, the cumulative playing time of the player can be divided based on one or more thresholds, such as, less than 1 hour, 1 to 10 hours, 10 to 50 hours, 50 to 100 hours and more than 100 hours. Correspondingly, players having played the game for less than 1 hour since installing or buying the game are grouped together, whereas players having played the game for a total duration between 1 and 10 hours (such as, 2.5 hours, 6 hours and so forth) can be grouped together. In one example, the cumulative playing time of the players can be associated to a ranking system for the players. In such an example, the players having played the game for less than 1 hour can be associated to a 'novice' rank, whereas the players having played the game between 1 and 10 hours can be associated to a 'beginner' rank. Similarly, players having played the game between 10 to 50 hours can be associated to an 'intermediate' rank; the players having played the game between 50 to 100 hours can be associated to an 'advanced' tank; the players having played the game for more than 100 hours can be associated to a 'master' rank.

In yet another example, the identified game parameter is a resource level of a player character associated with a client device. The term "resource level" as used herein, can relate to any gatherable "resource" that is gathered by the player character due to the player playing the game and correspondingly, advancing through different levels of the game. For example, such a resource can comprise an amount of experience (or "XP points") gathered by the player character, an amount of in-game currency acquired by the player character by fulfilling various in-game objectives presented to the player character, one or more "unlockables" attained by the player character by advancing through the game (such as, one or more character skins, weapon skins, voice lines, emotes and so forth) and the like. In such an example, players having a comparable resource level are grouped together, such as, players associated with player characters having XP points between 0 to 1000 can be grouped together, players associated with player characters having XP points between 1000 to 5000 can be grouped together, players having accumulated in-game currency between 0 to 100 points can be grouped together and so forth.

In yet another example, the identified game parameter is a resource available for an account associated with a client device. It will be appreciated that various games allow players thereof to interact with the game, through one or more actions performed outside the game. For example, the game may be a free-to-play game (or "F2P game") that allows players thereof access to premium features upon payment of a premium price associated with the premium features, such as, access to one or more characters, character-abilities, gameplay-features, rounds, and the like. Correspondingly, players who have not paid the premium price associated with the premium features are not allowed access to such premium features. It will be appreciated that if such players are allowed to play against the players having paid the premium price, such players will be playing the game with a disadvantaged position, thereby, depreciating a gameplay-experience for such players. Consequently, the players having the resources available for the account, such that the resources correspond to payment of the premium price corresponding to each of one or more premium features, are grouped together. For example, players having paid a premium price for unlocking one or more DLCs (or "downloadable content") associated with the game (such as, new player characters, additional-levels, story-expansions and so forth) are allowed to play the game with other players having unlocked the same DLCs.

Further, the processor is configured to define at least one group of client devices from the set of client devices. Herein, the at least one group of client devices includes client devices with a similar game parameter. Notably, the at least one group of client devices is defined on the basis of similar game parameters possessed by one or more players associated with the client devices. By "similar" is meant to define players that have values corresponding to one or more parameters within a range of +/−5% to +/−20% in quantifiable values. It will be appreciated that the range of defining similarity between one or more players associated with corresponding client devices may vary for different types of online games. In an example, the players are deemed to be similar based on the game parameter if the parameter value of a first player and a second player is within 5% from each other. In such a case, the first player and the second player are allocated to a same group.

Optionally, a number of groups can be defined on the basis of similar game parameters as mentioned above. In an example, six players associated with respective client devices (namely, a first player, a second player, a third player, a fourth player, a fifth player and a sixth player) have different skill levels. Herein, skill level of the first player is 2, skill level of the second player is 14, skill level of the third player is 3, skill level of the fourth player is 16, skill level of the fifth player is 7, and skill level of the sixth player is 20. Notably, the first player, third player and the fifth player have a similar skill level and the second player, the fourth player and the sixth player have a similar skill level. Therefore, the first player, third player and the fifth player are allocated to a first group, and the second player, the fourth player and the sixth player are allocated to a second group. Notably, the example discussed herein is only for understanding purposes. However, it will be appreciated that the processor is configured to efficiently identify hundreds of game parameters and accordingly define hundreds of groups of client devices based on similar game parameters.

Beneficially, in such a way, the one or more players associated with client devices in the set of client devices can be grouped into groups of client devices having a similar game parameter Further, the processor is configured to determine a communication latency between each of the client devices in the at least one group of client devices and a server. Optionally, the server is a gaming server, that is configured to host a number of gaming applications in the online game. Throughout the present disclosure, the term "server" as used herein refers to a structure and/or module that include programmable and/or non-programmable components configured to store, process and/or share information. Optionally, the server includes any arrangement of physical or virtual computational entities capable of enhancing information to perform various computational tasks. Furthermore, it should be appreciated that the server may be both single hardware server and/or plurality of hardware servers operating in a parallel or distributed architecture. In an example, the server may include components such as memory, a processor, a network adapter and the like, to store, process and/or share information with other computing components, such as the client device. Optionally, the server is an online gaming server. Herein, the server is configured to host the online game, thereby providing a number of gaming applications that can be accessed via the client devices. In this regard, the server may have a distributed architecture, such as the server may comprise a first gaming server and a second gaming server installed in different geographical locations.

Throughout the present disclosure, the term "communication latency" (also referred to as "latency" sometimes) as used herein refers to the time it takes for a signal to travel to and from the server. Notably, the communication latency depends on the speed of the transmission medium (e.g., copper wire, optical fiber or radio waves) and the delays in the transmission by devices along the way (e.g., routers and modems) to and from the server. A low latency indicates a high network efficiency. Notably, the communication latency is an important consideration with regard to other aspects of real time gaming systems where instantaneous response is required. Herein, a high latency (also called "lag") can add to the difficulty of determining which player performed an action first (such as shooting an opponent or answering a question). It will be appreciated that users may be satisfied with different communication latencies depending on the type of game and the skill level of the user. For example, 100 ms of latency may be tolerable for a slow casual game (like backgammon) or a slow-action role playing game, but in a fast action game a latency in excess of 70 or 80 ms may cause the user to perform more poorly in the game, and thus is unacceptable. For instance, in a game that requires fast reaction time there is a sharp decline in accuracy as latency increases from 50 to 100 ms. It will be appreciated that such communication latencies may be caused due to transmission losses, time required for compression, time required adjusting frame rates and the like.

Optionally, the communication latency can be determined by sending a control signal from each of the client devices to the server. Notably, the control signals are time-stamped, and therefore the time required for the test control signal to travel from a client device to the server is determined by calculating a difference in time provided by the time-stamps at each of the server location and the client terminal location. Notably, latency can be caused due to different predictable and unpredictable reasons in the network environment. Therefore, determination of the communication latency is partially dependent on a cause of communication latency. In further optional embodiment the communication latency can be determined using statistical methods. As an example average latency to the server can be used as a latency value for those clients for which the determination has not been done. It will be appreciated that, herein, the communication latency can be determined by various methods and systems of determination of communication latency known in the art.

Optionally, the processor is configured to share a pair of ciphered keys between each of the client devices in the at least one group of client devices and the server to securely determine communication latency therebetween. Herein, the ciphered keys are employed by the processor to encrypt and decrypt signals transmitted between the server and each of the client devices. Specifically, a first cipher key from the pair of ciphered keys is shared with each of the client devices and a second cipher key from the pair of ciphered keys is shared with the server. It will be appreciated that such encryption of the signals resists malicious third-party attacks, corruption or interference. Specifically, the ciphered keys provide access protection rights with defined constraints regarding rights to be exploited by the server.

In an instance, the ciphered keys are any one of: public key, private key. The communication latency is determined using symmetric cryptography technique or a symmetric cryptography technique. In an example, the asymmetric cryptography technique is used to determine the communication latency. In such a technique, once the connection is established between the server and the client device, the asymmetric key pair is generated on the client device, that typically comprises two unidentical numeric keys paired together. One key in the key pair is a public key that is generally shared with all users in the network, whereas other key is a private key that is kept secret within the client device. The generated public key of the key pair is communicated to the server and stored therein. Herein, the client device can sign a particular data (herein, the test control signal) with the private key and then communicate the test control signal to the server. The server is configured to verify the authenticity of the client device by decrypting the test control signal with the public key available. Herein, the processor securely determines communication latency between the sever and each of the client devices over a secure communication channel. Notably, the communication latency can be determined by enabling time identification of a time of transmission of data packets (namely, test control signal) from the client devices to each of the server and vice-versa. In particular, the pair of ciphered keys are used to securely transmit and receive the said test control signal.

More optionally, the processor is configured to establish a user datagram protocol (UDP) connection for determining communication latency between each of the client devices in the at least one group of client devices and the server. It will be appreciated that UDP runs on top of Internet Protocol. Notably, the UDP establishes low-latency and loss tolerating connections between the server and each of the client devices to reliably transmit signals therebetween. Therefore, the UDP connection ensures low delay (or, time interval) in propagation of data packets between the server and each of the client devices. In this regard, the processor is operable to determine a communication latency between the server and each of the client device to ensure desired propagation of data packets, specifically, signals to and from the server.

Further, the processor is configured to define at least one subgroup of client devices from each of the at least one group of client devices. Herein, the at least one subgroup of client devices includes client devices with a similar communication latency. Notably, the at least one subgroup of client devices is defined on the basis of similar communication latency between each of the client devices in the group of client devices and the server. By "similar" is meant to define the communication latency between the client devices in the group of client devices and the server within a range of +/−5% to +/−20%. It will be appreciated that the range of defining similarity between each of the client devices in the group may vary for different types of network environments. In an example, the players are deemed to be similar based on the communication latency if the latency value of a first player and a second player is within 5% from each other. In such a case, the first player and the second player are allocated to a same subgroup.

Optionally, a number of subgroups can be defined on the basis of similar communication latency as mentioned above. In an example, a group of client devices (namely, a first client device, a second client device, a third client device, a fourth client device, a fifth client device and a sixth client device) have different communication latencies. For example, the communication latency of the first client device is 100 milliseconds (ms), communication latency of the second player is 85 milliseconds (ms), communication latency of the third player is 113 milliseconds (ms), communication latency of the fourth player is 78 milliseconds (ms), communication latency of the fifth player is 127 milliseconds (ms), and communication latency of the sixth player is 90 milliseconds (ms). Notably, the first client device, third client device and the fifth player client device a similar communication latency and the second client device, the fourth client device and the sixth client device have a similar communication latency. Therefore, the first client device, the third client device and the fifth client device are allocated to a first subgroup, and the second client device, the fourth client device and the sixth client device are allocated to a second subgroup. Notably, the example discussed herein is only for understanding purposes. However, it will be appreciated that the processor is configured to efficiently determine communication latencies for a number of client devices in each of the at least one group of client devices and accordingly define a number of subgroups based on similar communication latency. Beneficially, the subgroups thus obtained have a similar game parameter and a similar communication latency.

Optionally, the processor is configured to define the at least one subgroup of client devices. The processor is configured to measure a first latency value associated with a communication between a first client device of the at least one group of client devices and the server. Further, the processor is configured to measure a second latency value associated with a communication between a second client device of the at least one group of client devices and the server. As aforementioned, the first latency value and the second latency value can be determined by sending a test control signal from the first client device to the server, and from the second client device to the server respectively. Furthermore, the first latency value and the second latency value can be determined by sharing a pair of ciphered keys to securely determine the communication latency.

In a first example, the first communication latency value can be determined to be 200 ms and the second communication latency value can be determined to be 150 ms. In a second example, the first latency value is determined to be 200 ms and the second latency value is determined to be 78 ms Further, the processor is configured to calculate a difference between the first latency value and the second latency value. In the first example, the difference between the first latency value and the second latency value is calculated to be 50 ms. In the second example, the difference between the first latency value and the second latency value is calculated to be 122 ms. Further, the processor is configured to allocate the first client device and the second client device to a same subgroup of client devices, if the calculated difference is below a pre-determined threshold value. Further, the processor is configured to allocate different subgroups of client devices, if the calculated difference is above the pre-determined threshold value. Herein, the pre-determined threshold value is the latency value below which the client devices of the group are allocated to a same subgroup, and below which the client devices of the group are allocated to different subgroups. In above mentioned examples, consider that the pre-determined threshold value is 60 ms. In the first example, the calculated difference is 50 ms, which is below the pre-determined threshold value, therefore the first client device and the second client device are allocated to a same subgroup of client devices. In the second example, the calculated difference is 112 ms, therefore the first client device and the second client device are allocated to different subgroups of client devices.

In an exemplary implementation, the set of client devices are divided into two groups and five subgroups based on the game parameters and communication latency, as described in conjunction with Table 1.

TABLE 1

| Player ID | Game Parameter | Group | Latency (ms) | Subgroup |
|---|---|---|---|---|
| 1 | Skilled | 1 | 100 | A |
| 2 | Skilled | 1 | 120 | A |
| 3 | Not Skilled | 2 | 85 | B |
| 4 | Not Skilled | 2 | 130 | C |

TABLE 1-continued

| Player ID | Game Parameter | Group | Latency (ms) | Subgroup |
|---|---|---|---|---|
| 5 | Not Skilled | 2 | 135 | C |
| 6 | Not Skilled | 2 | 90 | B |
| 7 | Skilled | 1 | 110 | A |
| 8 | Skilled | 1 | 70 | D |
| 9 | Skilled | 1 | 60 | D |
| 10 | Not Skilled | 2 | 55 | E |

As may be seen from the table, there are 10 players that have assigned with unique identifiers. Herein, the 10 players are divided into two groups, namely 'Group 1' and 'Group 2', based on a skill level of each of the players. The players having a player ID 1, 2, 7, 8 and 9 are allocated to 'Group 1' as the players are skilled, and the players having a player ID 3, 4, 5, 6 and 10 are allocated to 'Group 2' as the players are not skilled.

Further, 'Group 1' and 'Group 2' are further divided into 5 subgroups, based on the communication latency values. The players in 'Group 1' a similar communication latency value, i.e. players with player ID 1, 2, 7 are allocated to subgroup 'A'. The players in 'Group 2' and having a similar communication latency value, i.e. players with player ID 3 and 6 allocated to subgroup 'B'. The players in 'Group 2' and having a similar communication latency value, i.e. players with player ID '4' and '5' are allocated to subgroup 'C'. The players 'Group 1' and having a similar communication latency value, i.e. players with player ID 8 and 9, are allocated to subgroup 'D'. Further, the player with player ID 10 is in subgroup 'E' alone as the communication latency value for the player that it not fair to let person play against players in his own skill level.

Optionally, the player with player ID 10 is associated to subgroup 'A' i.e. the subgroup which has better players. The player 10 can be allowed in the group as the short latency compensates lack of skills i.e. the gaming experience does not suffer. In an alternative embodiment the player 10 is associated with group 'A' but a delay module (as discussed later in detail) is added to the apparatus and/or the gaming server. In such a case, latency can be introduced in the players of subgroup 'A', in order to accommodate player with player ID 10. In yet another alternative embodiment, player with player ID 7 can be assigned to group E. This way more skillful player with player ID 7 can play against less skill full player with player ID 10, but the difference on latency will compensate and lead to good gaming experience.

According to an optional arrangement for a player that has no measured or determined latency value, an average latency value of other players associated with the same server as the player is using can be used. This is beneficial as reduces need to measure latency values for all of the players.

Further, the processor is configured to enable the client devices in the at least one subgroup of client devices to engage in a game session of the online game. In particular, the client devices that associated with a particular subgroup, are instructed by the processor to engage in the same game session of the online game. Notably, the online game is played in different sessions, say each level of the online game is a game session. Herein, the client devices of each of the subgroup are engaged in the same game session, such that the players associated with client devices have a fair play gaming experience. In an example, a first player and a second player, each associated with client devices in the same subgroup are allowed to play against each other in the same game session to provide a competitive gaming experience to the user. In another example, the first player and the second player are allowed to play with each other as a team, in the same game session to provide a an enhances user-experience to the players.

According to an embodiment, the processor is further configured to reallocate a client device to a different subgroup upon change in the game parameter or a change in the communication latency thereof. It will be appreciated that game parameter for each of the client devices and/or the communication latency between each of the client devices and the server are dynamic entities, i.e. such values may change over a period of time. For this purpose, the processor further comprises a co-ordination module that is configured to continuously monitor each of the game parameters and communication latencies (collectively referred to as "entities" hereinafter) associated with each of the client devices, and redefine the groups and the subgroups based on changed entities.

Optionally, the processor is configured to store a structured list of each of the client devices that are connected to the server in real-time and/or over a period of time in the memory. Further, each of the client devices may have a unique identification value that is associated with corresponding client devices in the list and is subsequently stored in the memory. Notably, the game parameters associated with each of the client devices, communication latencies associated with each of the client devices, the groups and subgroups to which the client devices are associated are stored in the memory. The co-ordination module of the processor is configured to access the structured list and constantly update the structured list accordingly in real-time or near real-time. Further, the processor is configured to reallocate one or more client devices based on the changed game parameters and the communication latency of the one or more client devices. It will be appreciated that such a technique ensures that the players have a fair experience, in a dynamic environment, i.e. when the entities of the online game are subjected to a constant change.

Optionally, the processor is configured to associate a first subgroup of the at least one group of client devices with a first gaming server and a second subgroup of the at least one group of client devices with a second gaming server. Notably, as aforementioned the server is a gaming server and may have a distributed architecture, such as different gaming server are arranged in different locations. In an example, the first gaming server may be arranged in a first location and the second gaming server may be arranged in a second location. Herein, the processor is configured to associate the first subgroup of the client devices to the first gaming server, and the second subgroup of client devices to the second gaming server. It will be appreciated that such an apparatus ensures that the client devices allocated to the same subgroup have a common access point, thereby maintain the communication latency for each of the client devices in the subgroup. Optionally, the processor is further configured to enable client devices in the first subgroup of client devices to engage in a same game session with the associated first gaming server. Further, the processor is configured to enable client devices in the second subgroup of client devices to engage in a same game session with the associated second gaming server.

In one or more embodiments, the processor is further configured to reallocate the client devices from the first gaming server to the second server and vice versa. i.e. according to embodiment, if there is no feasible client device associated with a particular subgroup among the first set of sub-groups associated with the first gaming server, then the user might be re-routed to other server where a match can be made in the subgroups associated with the re-allocated gaming server.

According to an embodiment, the processor is further configured to associate a delay module with one or more of the client devices in the at least one subgroup of client devices to form a substantially identical communication latency between the client devices in the at least one subgroup of client devices with the server. Throughout the present disclosure, the term "delay module" refers to a collection or set of instructions executable by the processor as to configure the processor to perform delay of one or more signals as received from the server and subsequently routed to the client device and vice-versa. Further, the term "delay module" may also refer to a programmable and/or non-programmable electronic device that is configured to provide a delay in the communication to and from the client devices and/or the server.

In this regard, upon determining the communication latency between the server and each of the client devices, the processor associates suitable delay module the one or more of the client devices in the at least one subgroup of client devices. Optionally, the delay module is configured to increase the communication latency between one or more client devices in the at least one subgroup of client devices and the server to form substantially identical communication latency. Notably, the delay module ensures substantially identical communication latency between each of the client devices and the server. Therefore, each of the client devices receive data packets at substantially identical time. Such identical time of receiving the data packets from the server ensures that user associated with each of the client devices receive similar experience thereby preventing any lag in action of the users and further provides enhanced user-experience.

As aforementioned, the present disclosure also provides a system for managing an online game, the system comprising a server and an apparatus. The server is communicatively coupled to a set of client devices. The apparatus is communicatively coupled to the server and the set of client devices. Herein, the apparatus is configured to identify a set of client devices engaged in an online game, the set of client devices communicatively coupled to the apparatus, identify one or more game parameters associated with each of the client devices in the set, define at least one group of client devices from the set of client devices, wherein the at least one group of client devices includes client devices with a similar game parameter, determine a communication latency between each of the client devices in the at least one group of client devices and a server, define at least one subgroup of client devices from each of the at least one group of client devices, wherein the at least one subgroup of client devices includes client devices with a similar communication latency, and enable the client devices in the at least one subgroup of client devices to engage in a game session of the online game.

The embodiments and details disclosed above apply mutatis mutandis to the said system for managing the online game.

As aforementioned, the present disclosure also provides the method for managing an online game. The embodiments and details disclosed above apply mutatis mutandis to the said method for managing the online game.

Optionally, the game parameter comprises one or more of a skill level of a player associated with a client device, a cumulative playing time of a player associated with a client device, a resource level of a player character associated with a client device, and resources available for an account associated with a client device.

Optionally, the method of defining the at least one subgroup comprises:
measuring a first latency value associated with a communication between a first client device of the at least one group of client devices and the server;
measuring a second latency value associated with a communication between a second client device of the at least one group of client devices and the server;
calculating a difference between the first latency value and the second latency value; and
allocating the first client device and the second client device to:
a same subgroup of client devices, if the calculated difference is below a pre-determined threshold value; or
different subgroups of client devices, if the calculated difference is above the pre-determined threshold value.

Optionally, the method further comprises reallocating a client device to a different subgroup upon change in the game parameter or a change in the communication latency thereof.

Optionally, the method further comprises associating a first subgroup of the at least one group of client devices with a first server and a second subgroup of the at least one group of client devices with a second server.

Optionally, the method further comprises:
enabling client devices in the first subgroup of client devices to engage in a same game session with the associated first server; and
enabling client devices in the second subgroup of client devices to engage in a same game session with the associated second server.

Optionally, the method further comprises sharing a pair of ciphered keys between each of the client devices in the at least one group of client devices and the server for securely determining communication latency therebetween.

Optionally, the method further comprises establishing a user datagram protocol (UDP) connection for determining communication latency between each of the client devices in the at least one group of client devices and the server.

Optionally, the method further comprises forming a substantially identical communication latency between the client devices in the at least one subgroup of client devices with the server.

Optionally, the method further comprises increasing the communication latency between one or more client devices in the at least one subgroup of client devices and the server to form substantially identical communication latency.

DETAILED DESCRIPTION OF THE DRAWINGS

Referring to FIG. 1, illustrated is a schematic illustration a block diagram of a network environment 100, in accordance with an embodiment of the present disclosure, in accordance with an embodiment of the present disclosure. The network environment 100 includes an apparatus 102 comprising a processor 104 and a memory 106, gaming servers such as a first gaming server 108 and a second gaming server 110, client devices such as a first client device 112, a second client device 114, a third client device 116, and a fourth client device 118. Further, the system comprises a communication network 120 over which communication between all the aforementioned entities takes place.

It will be appreciated that FIG. 1 is merely an example, which should not unduly limit the scope of the claims herein. It is to be understood that the specific designation for the apparatus 102 for managing an online game is provided as an example and is not to be construed as limiting the apparatus 102 to specific numbers, types, or arrangements of processor 104, memory 108, gaming servers such as the first gaming server 108 and the second gaming server 110, client devices such as a first client device 112, a second client device 114, a third client device 116, and a fourth client device 118, and communication network 120. A person skilled in the art will recognize many variations, alternatives, and modifications of embodiments of the present disclosure.

Referring to FIG. 2, illustrated is a flowchart 200 depicting steps to define at least one subgroup of client devices, in accordance with an embodiment of the present disclosure. At step 202, a first latency value associated with a communication between a first client device of the at least one group of client devices, and the server is measured. At step 204, a second latency value associated with a communication between a second client device of the at least one group of client devices and the server is measured. At step 206, a difference between the first latency value and the second latency value is calculated. At step 208, a decision is made that whether the calculated difference is above a pre-determined threshold value. If the calculated difference is below a pre-determined threshold value, path "Y" is followed, and if the calculated difference is above the pre-determined threshold value, path "N" is followed. When path "Y" is followed, step 210 is executed and the first client device and the second client device are allocated to a same subgroup of client devices. When path "N" is followed, step 212 is executed and the first client device and the second client device are allocated to different subgroups of client devices.

Referring to FIG. 3, illustrated is a flowchart depicting steps of a method for managing an online game, in accordance with an embodiment of the present disclosure. At step 302, a set of client devices engaged in an online game is identified. At step 304, one or more game parameters associated with each of the client devices in the set are identified. At step 306, at least one group of client devices from the set of client devices is defined, wherein the at least one group of client devices includes client devices with a similar game parameter. At step 308, a communication latency between each of the client devices in the at least one group of client devices and a server is determined. At step 310, at least one subgroup of client devices from each of the at least one group of client devices is defined, wherein the at least one subgroup of client devices includes client devices with a similar communication latency. At step 312, the client devices in the at least one subgroup of client devices are enabled to engage in a game session of the online game.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. An apparatus for managing a game session of a multiplayer online game, the apparatus comprising a processor and a memory, wherein the processor is configured to:
identify a set of client devices that are actively communicatively coupled to the apparatus over a communication network by determining an active communication link between client devices of the set of client devices and the a host of the multi-player online game;

group a first sub-set of client devices, the first sub-set of client devices having a game parameter that is common to all client devices in the first sub-set of client devices;

group a second sub-set of client devices from the first sub-set of client devices by:
 measuring a first latency value associated with a communication between a first client device of the first sub-set of client devices and the host;
 measuring a second latency value associated with a communication between a second client device of the first sub-set of client devices and the host;
 calculating a difference between the first latency value and the second latency value;
 allocating the first client device and the second client device to the second sub-set of client devices if the calculated difference is below the pre-determined threshold value; and enable only client devices in the second sub-set of client devices to engage in a same game session of the multiplayer online game.

2. The apparatus according to claim 1, wherein the processor is configured to group the first sub-set of client devices by identifying the game parameter, wherein the game parameter comprises one or more of a skill level of the player associated with the client device, a cumulative playing time of the player associated with the client device, a resource level of a player character associated with the client device, and resources available for an account associated with the client device.

3. The apparatus according to claim 1, wherein the processor is configured to allocate the first client device and the second client device to a different sub-set of client devices if the calculated difference is above the pre-determined threshold value.

4. The apparatus according to claim 1, wherein the processor is further configured to reallocate a client device from the second sub-set of client devices to a different group upon a change in one or more of the game parameter or the communication latency.

5. The apparatus according to claim 1, wherein the processor is configured to associate a first second sub-set of client devices with a first gaming server and a second second sub-set of client devices with a second gaming server; and
 enable client devices in the first second sub-set of client devices to engage in a same game session with the associated first gaming server; and
 enable client devices in the second second sub-set of client devices to engage in a same game session with the associated second gaming server.

6. The apparatus according to claim 1, wherein the processor is configured to share a pair of ciphered keys between each of the client devices in the first sub-set of client devices and the host to determine the communication latency.

7. The apparatus according to claim 1, wherein the processor is configured to establish a user datagram protocol (UDP) connection for determining the communication latency between client devices and the host.

8. The apparatus according to claim 1, wherein the processor is further configured to associate a delay module with client devices to form a substantially identical communication latency between client devices and the host.

9. The apparatus according to claim 8, wherein the delay module is configured to increase the communication latency to form the substantially identical communication latency between the client devices and the host.

10. A method for managing a game session of a multi-player online game, the method comprising:
 identifying a set of client devices actively communicatively coupled to the apparatus over a communication network by determining an active communication link between client devices of the set of client devices and the a host of the multi-player online game;
 group a first sub-set of client devices, the first sub-set of client devices having a game parameter that is common to all client devices in the first sub-set of client devices;
 group a second sub-set of client devices from the first sub-set of client devices by:
  measuring a first latency value associated with a communication between a first client device of the first sub-set of client devices and the host;
  measuring a second latency value associated with a communication between a second client device of the first sub-set of client devices and the host;
  calculating a difference between the first latency value and the second latency value;
  allocating the first client device and the second client device to the second sub-set of client devices if the calculated difference is below the pre-determined threshold value; and
 enable only client devices in the second sub-set of client devices to engage in a same game session of the multiplayer online game.

11. The method according to claim 10, wherein the method further comprises grouping the first sub-set of client devices by identifying the game parameter, wherein the game parameter comprises one or more of a skill level of the player associated with the client device, a cumulative playing time of the player associated with the client device, a resource level of a player character associated with the client device, and resources available for an account associated with the client device.

12. The method according to claim 10, wherein grouping the second sub-set of client devices further comprises:
 allocating the first client device and the second client device to
 a different sub-set of client devices if the calculated difference is above the pre-determined threshold value.

13. The method according to claim 10, further comprising reallocating a client device from the second sub-set of client devices to a different group upon a change in one or more of the game parameter or the communication latency.

14. The method according to claim 10, further comprising associating a first second sub-set of client devices with a first gaming server and a second second sub-set of client devices with a second gaming server; and
 enabling client devices in the first second sub-set of client devices to engage in a same game session with the associated first gaming server; and
 enabling client devices in the second second sub-set of client devices to engage in a same game session with the associated second gaming server.

15. The method according to claim 10, the method further comprising sharing a pair of ciphered keys between each of the client devices in the first sub-set of client devices and the host to determine the communication latency.

16. The method according to claim 10, the method further comprising establishing a user datagram protocol (UDP) connection for determining the communication latency between client devices and the host.

17. The method according to claim 10, the method further comprising associating a delay module with client devices to form a substantially identical communication latency between client devices and the host.

18. The method according to claim 17, the method further comprising using the delay module to increase the communication latency to form the substantially identical communication latency between the client devices and the host.

19. A system for managing a game session of a multiplayer online game, the system comprising:
- a server communicatively coupled to client devices; and
- an apparatus communicatively coupled to the server and the client devices, wherein the apparatus is configured to:
- identify client devices that are actively communicatively coupled to the apparatus over a communication network by determining an active communication link between the client devices and the a host of the multiplayer online game;
- group a first sub-set of the client devices, the first sub-set of the client devices having a game parameter that is common to all client devices in the first sub-set of client devices;
- group a second sub-set of client devices from the first sub-set of client devices by:
  - measuring a first latency value associated with a communication between a first client device of the first sub-set of client devices and the host;
  - measuring a second latency value associated with a communication between a second client device of the first sub-set of client devices and the host;
  - calculating a difference between the first latency value and the second latency value;
  - allocating the first client device and the second client device to the second sub-set of client devices if the calculated difference is below the pre-determined threshold value; and
- enable only client devices in the second sub-set of client devices to engage in a same game session of the multiplayer online game.

20. The system according to claim 19, wherein the apparatus is configured to group the first sub-set of client devices by identifying the game parameter, wherein the game parameter comprises one or more of a skill level of the player associated with the client device, a cumulative playing time of the player associated with the client device, a resource level of a player character associated with the client device, and resources available for an account associated with the client device.

* * * * *